United States Patent [19]

Milenkovic

[11] Patent Number: 4,907,937
[45] Date of Patent: Mar. 13, 1990

[54] NON-SINGULAR INDUSTRIAL ROBOT WRIST

[75] Inventor: Veljko Milenkovic, Birmingham, Mich.

[73] Assignee: Ford Motor Company, Dearborn, Mich.

[21] Appl. No.: 752,753

[22] Filed: Jul. 8, 1985

[51] Int. Cl.$^4$ .............................................. B25J 17/00
[52] U.S. Cl. ..................................... 414/735; 901/15; 901/28; 901/29
[58] Field of Search .................. 414/730, 735; 901/15, 901/19, 25, 28, 29, 45; 74/469, 479; 464/106, 109, 112, 125, 136

[56] References Cited

U.S. PATENT DOCUMENTS

| | | | |
|---|---|---|---|
| 3,580,099 | 5/1971 | Mosher | 74/469 |
| 4,107,948 | 8/1978 | Molaug | 64/2 P |
| 4,300,362 | 11/1981 | Lande et al. | 64/17 R |
| 4,353,677 | 10/1982 | Susnjara et al. | 414/735 |
| 4,365,928 | 12/1982 | Baily | 414/735 |
| 4,568,311 | 2/1986 | Miyake | 464/109 |

FOREIGN PATENT DOCUMENTS

| | | | |
|---|---|---|---|
| 3036116 | 5/1982 | Fed. Rep. of Germany | 901/29 |
| 738863 | 6/1980 | U.S.S.R. | 901/15 |
| 2100226 | 12/1982 | United Kingdom | 414/730 |

OTHER PUBLICATIONS

A New Pitch-Yaw-Roll Mechanical Robot Wrist Actuator, vol. 2, Society of Manufacturing Engineers, Jun. 2-6, 1985, Mark E. Rosheim, Proceedings of Robots 9 Conference.

Primary Examiner—Joseph E. Valenza
Attorney, Agent, or Firm—Frank G. McKenzie; Donald J. Harrington

[57] ABSTRACT

The end of a robot arm includes two links, a first or inner link supported rotatably about a central axis and an end link at which a tool is carried. Located between the links are a rod and a tube whose longitudinal axes are concentric. Each of four gimbal rings is used as a member of a universal joint that connects the links, the rod and the tube. The links are connected by two universal joints in series, and the rod connects these joints. The links are also connected by two other universal joints in series and the tube connects this second pair of joints. The first and second pairs of universal joints connected in series are connected to one another in parallel. Gimbal rings rotatably supported on the tube and on the links for angular movement about yaw axis provide rotational support for the links and the connecting rod about the pitch axis. Actuating rods connected to the inner set of gimbal rings produce articulation of the wrist about these axis when the rods are actuated. Angular pitch displacement and angular yaw displacement are equalized between the inner set of gimbal rings and the outer set of gimbal rings by tension members. Alternatively, continuously meshing gear wheel portions equalize yaw and pitch rotational displacement, respectively.

18 Claims, 6 Drawing Sheets

NON-SINGULAR INDUSTRIAL ROBOT WRIST

BACKGROUND OF THE INVENTION

1. Field of the Invention

This invention relates to the field of industrial robots, more particularly to the wrist configuration for a robot arm and especially to a nonsingular wrist construction.

2. Description of the Prior Art

Most wrist mechanisms used with industrial robot arms exhibit certain singular positions at which articulation becomes limited, i.e., where one degree of freedom is lost. Normally, the singularities occur well within the normal operating range of the wrist.

Increasingly, commercial robots are required to traverse a complicated three dimensional path at high speed and within a stringent accuracy tolerance. In these conditions, a robot having six degrees of freedom is needed to accomplish the desired motion. The motion of a tool carried by the robot arm forms a continuous path both in position and orientation. As wrist agility and dexterity increase, the smoothness of the path traversed by the tool and its coverage increase accordingly. Wrist agility is usually determined by its roll speed, i.e., the speed of rotation about the roll axis. Wrist dexterity is determined by the range of bend-back angle and the range of roll rotation. The manipulator for an industrial robot is generally moveable with respect to a reference base, such as a robot arm or boom, through a multiple axis articulated joint system through which the base and manipulator are connected. Power supplied to a component of the arm is transmitted through gearing to the manipulator, which grips a tool or another workpiece. Examples of systems which have employed bevel gear trains for this purpose are described in U.S. Pat. Nos. 4,353,677 and 4,365,928.

The robot arm on which the manipulator is attached can either be an inflexible structure having a wrist mechanism at its end, which can accommodate five or six degrees of freedom of the manipulator, or the robot arm itself may be flexible and comprise successive links hinged to each other by means of universal joints in order to produce the required translation and rotary movement of the manipulator. U.S. Pat. No. 4,107,948 describes a robot arm of this type. Another example of an articulating mechanism that produces large angular rotation of the manipulator with respect to the base using a multiple link connected in series along the arm is described in U.S. Pat. No. 3,580,099.

Also known in the prior art are mechanisms for transmitting along the arm axial motion applied to the base or inner end of the manipulator and converting that motion to articulation of the outer end of the manipulation arm. In the example described in U.S. Pat. No. 4,300,362, two rings spaced axially along the arm are linked by two connecting rods that are connected to the ring by joints having two degrees of freedom. In order to control the displacement of the outer ring relative to the inner ring, two control rods apply force through an elbow attached to the inner ring, the elbow having two degrees of freedom and being connected to links that extend transversely along the axis of the manipulating arm.

Complete control of tool orientation requires three rotational degrees of freedom; roll, i.e., rotation of the tool about its longitudinal centerline; pitch, vertical deflection of the tool centerline; and yaw, lateral deflection of the tool centerline. In a conventional wrist mechanism known from the prior art, the first link is rotatably connected to the robot arm. The second link is rotatably connected to the first link, and the axis of the second rotation is usually perpendicular to the first axis. A third wrist link is rotatably connected to the second link, and the axis of the third rotation is usually perpendicular to the second link. The angle between the first and the third axes is not constant but varies depending on the angular displacement of the second axis. Singularity occurs when the first and third axes become parallel or coincident, a condition called "gimbal lock".

For example, if two shafts are connected by an ordinary universal joint such as Hooke joint or Cardan joint, the shafts cannot rotate when the deflection angle of the joint becomes 90 degrees. Nonsingular wrist mechanisms in the prior art avoid gimbal lock by providing additional rotary joints. The total angular deflection of the end link and tool is distributed over several joints, each joint articulating through substantially less than 90 degrees. By positive mechanical means, the deflection angle of consecutive joints are constrained to depend on each other so that the overall mechanism possesses no more than three degrees of freedom. Usually three or four universal joints in series are interposed between the first and the end wrist links. A disadvantage of such wrists is a large amount of backlash and the associated lack of precision and stiffness required to control within acceptable tolerance the orientation of the end link and tool.

SUMMARY OF THE INVENTION

In overcoming these and other disadvantages of the prior art, the industrial robot wrist mechanism according to this invention includes an end link to which a tool is attached and a first link connected to a robot arm. Located between these links are two concentric connecting members, a rod and a tube. Four gimbal rings are each rotatably connected to two of the other four wrist mechanism members. Each of the four gimbal rings functions as an intermediate member of the universal joint. A first joint comprises a first gimbal ring rotatably connected to a first link, which permits yaw rotation about a vertical pivot axis, and the rod connected to the first gimbal ring, which permits pitch rotation about a horizontal pivot axis. The second joint comprises the second gimbal ring, which is concentric with the first gimbal ring and connected to the first link to permit pitch rotation, and the tube which is connected to the second gimbal ring to permit yaw rotation. The second and third universal joints are mutually concentric, located at the outer end of the rod, and articulate about the common center. The third joint includes a third gimbal ring, which is rotatably connected to the end link for yaw rotation, and the rod, which is rotatably connected to the third gimbal ring for pitch rotation. The fourth joint comprises a fourth gimbal ring, which is rotatably mounted on the end link for pitch rotation, and the tube, which is rotatably mounted on the fourth gimbal ring for yaw rotation.

The first link and end link are, therefore, interconnected by two universal joints, the first and third joints being connected in series. The rod functions as an intermediate shaft in parallel with the first and third joints. The first link and end link are connected by two additional universal joints in series. The second and fourth universal joints are connected by the tube.

As a result of this arrangement, the angular displacement in pitch, or yaw, or a combination of pitch and yaw, of the tube is the same as that of the rod because the first and second universal joints undergo identical angular displacement in magnitude and direction. Similarly, the deflection in the third universal joint is the same as that in the fourth joint.

Because of the equality of deflection in each of the four universal joints, the deflection angle between the centerline of the end link and the centerline of the robot arm is exactly twice as large as the angle between the centerline of the rod and tube and the centerline of the robot arm. Furthermore, the sense of direction of the displacement between the centerline of the end link and the centerline of the robot arm is the same as the sense of direction of the angular displacements between the centerline of the tube and the centerline of the robot arm in pitch, yaw and any combination of pitch and yaw. Therefore, the axis of the robot arm, the axis connecting the centers of the gimbal rings, and the axis of the end link always lie in the same plane.

The industrial robot wrist mechanism of this invention articulates an end link to which a tool is attached that is free of singularity, accurate in its movement, free of excessive structural deflection and has minimum backlash.

With this arrangement, an end link with any tool attached to it can be given large deflections in pitch or yaw or a combination of pitch and yaw beyond 90 degrees and as high as 100 degrees, but the deflection of each universal joint is only one-half of that deflection displacement. Therefore, no singularity or gimbal lock results.

DESCRIPTION OF THE PREFERRED EMBODIMENT

Figure 1:
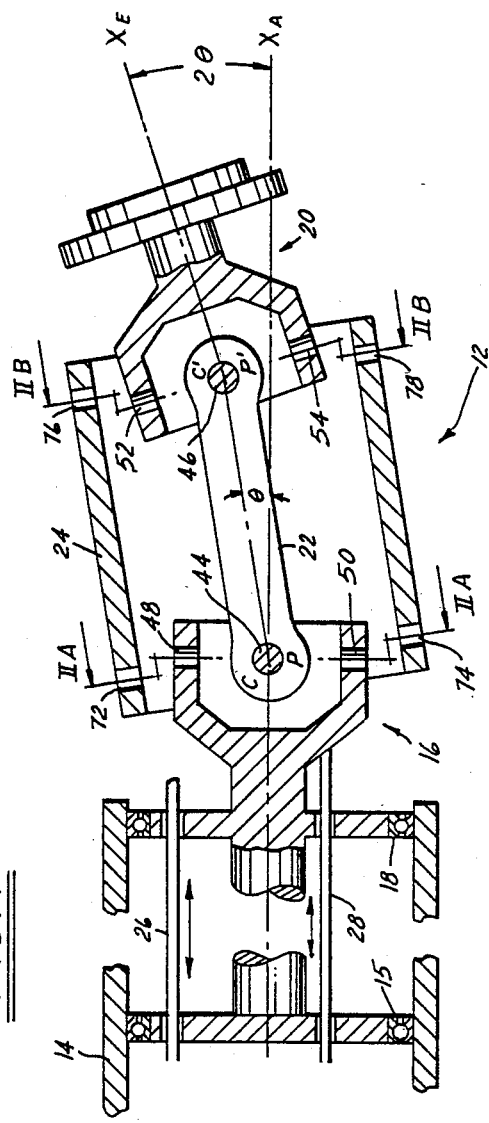
FIG. 1 is a schematic cross section of a non-singular wrist for an industrial robot according to the present invention taken at the vertical plane through centers C and C'. The inner and outer gimbal rings are deleted, and the assembly is shown with pitch displacement.

Referring first to FIG. 1, an industrial robot wrist mechanism 12 is supported at the end of the robot arm 14 on bearings that permit rotation about a longitudinal axis A—A but is prevented from rotation and displacement with respect to any other axis. This mechanism includes a first link 16 rotatably supported on the bearings 15, 18, an end link 20 to which a tool or workpiece is attached for movement by the wrist mechanism, a connecting rod 22 rotatably supported at a first or inboard pin connection C, a second center or outboard pin connection C', and a connecting tube 24.

Pull rods 26, 28 move longitudinally in both directions, as indicated by the arrows adjacent the pull rod in FIG. 1, in accordance with the drive produced by a transmission mechanism, which may include a rotatable reversible electric motor and appropriate meshing gear wheels and worm gears.

Figure 2B:
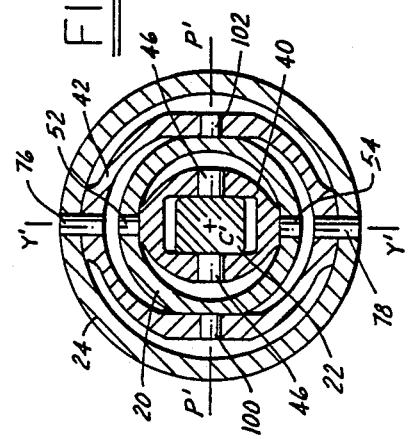
FIG. 2B is a cross section taken at plane IIB—IIB.
Figure 2A:
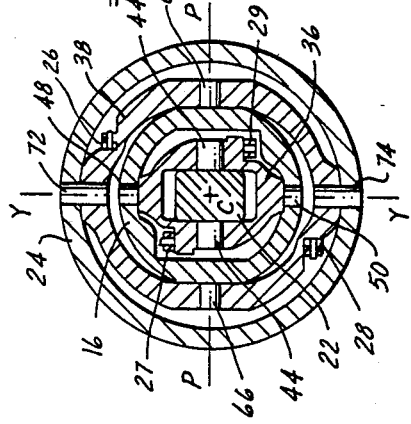
FIG. 2A is a cross section taken at plane IIA—IIA of FIG. 1 viewed inwardly toward the robot arm.
Figure 3:
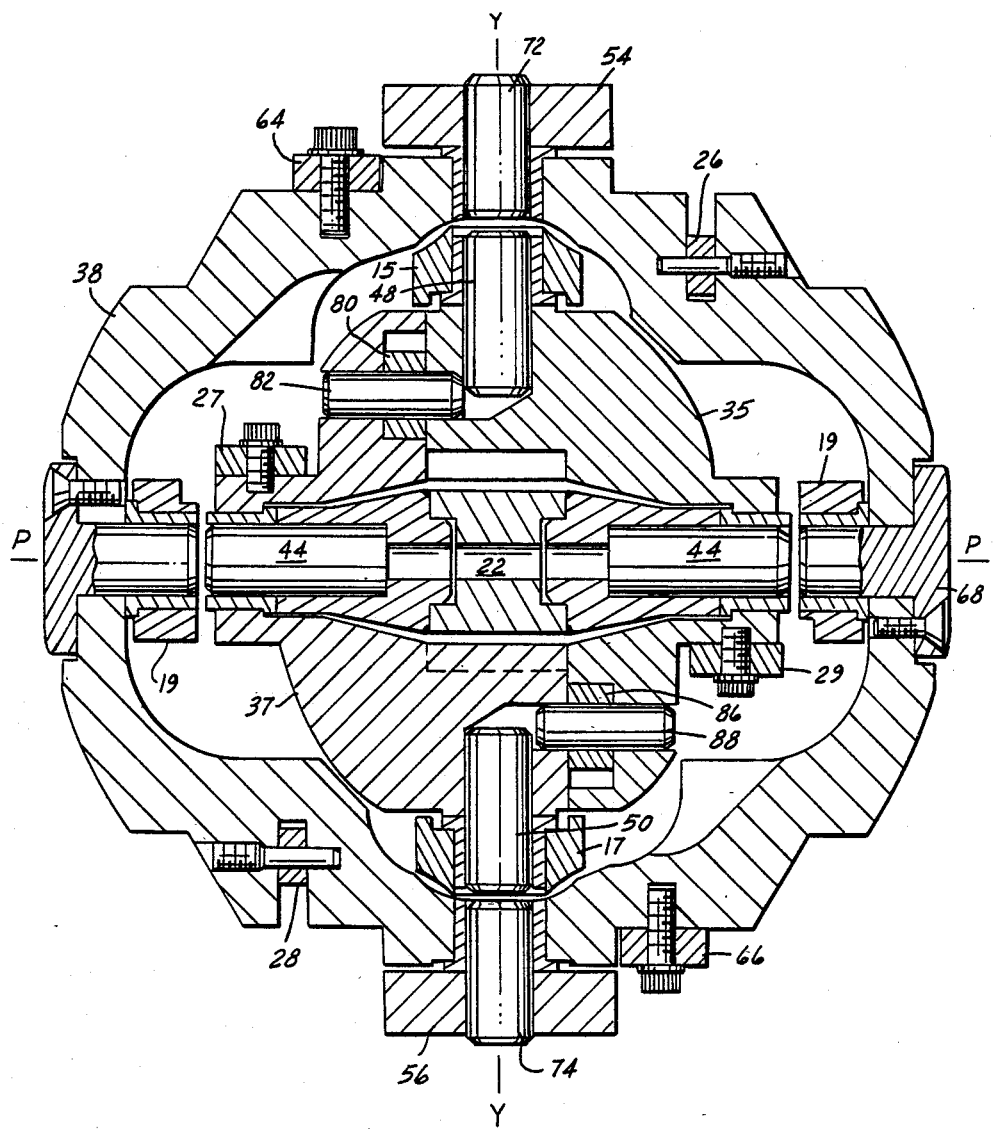
FIG. 3 is a cross section of the wrist taken at a transverse plane through center C viewed inwardly toward the robot arm and pull rods.

FIG. 2A shows, in addition to the components illustrated in FIG. 1, other components having their centers located at C, which have been deleted from FIG. 1 for reason of clarity. For example, a first or inner gimbal ring 36 is rotatably mounted on first link 16 for rotation about axis Y—Y and provides support for the inner end of the connecting rod 22, which support permits the rod to pivot about the P—P axis. A second or outer gimbal ring 38 is rotatably mounted on the first link 16 for rotation about axis P—P and provides support for the connecting tube 24, which support permits the tube to pivot about the Y—Y axis. The Y—Y and P—P axes intersect at center C, are mutually perpendicular and are perpendicular also to axis C—C', when the components of the wrist are undeflected and have their longitudinal axes colinear with axis C—C'.

A third or inner gimbal ring 40 is pivotally mounted on end link 20 for rotation about the Y'—Y' axis. The third gimbal ring has its center located at C', is rotatably connected to end link 20 for rotation about the axis Y'—Y' and provides support for the outer end of connecting rod 22 for rotation about the P'—P' axis. A fourth gimbal ring 42 also has its center located at C', is rotatably supported on connecting tube 24 for rotation about the Y'—Y' axis and rotatably supports end link 20 for rotation about the P'—P' axis.

Figure 4:
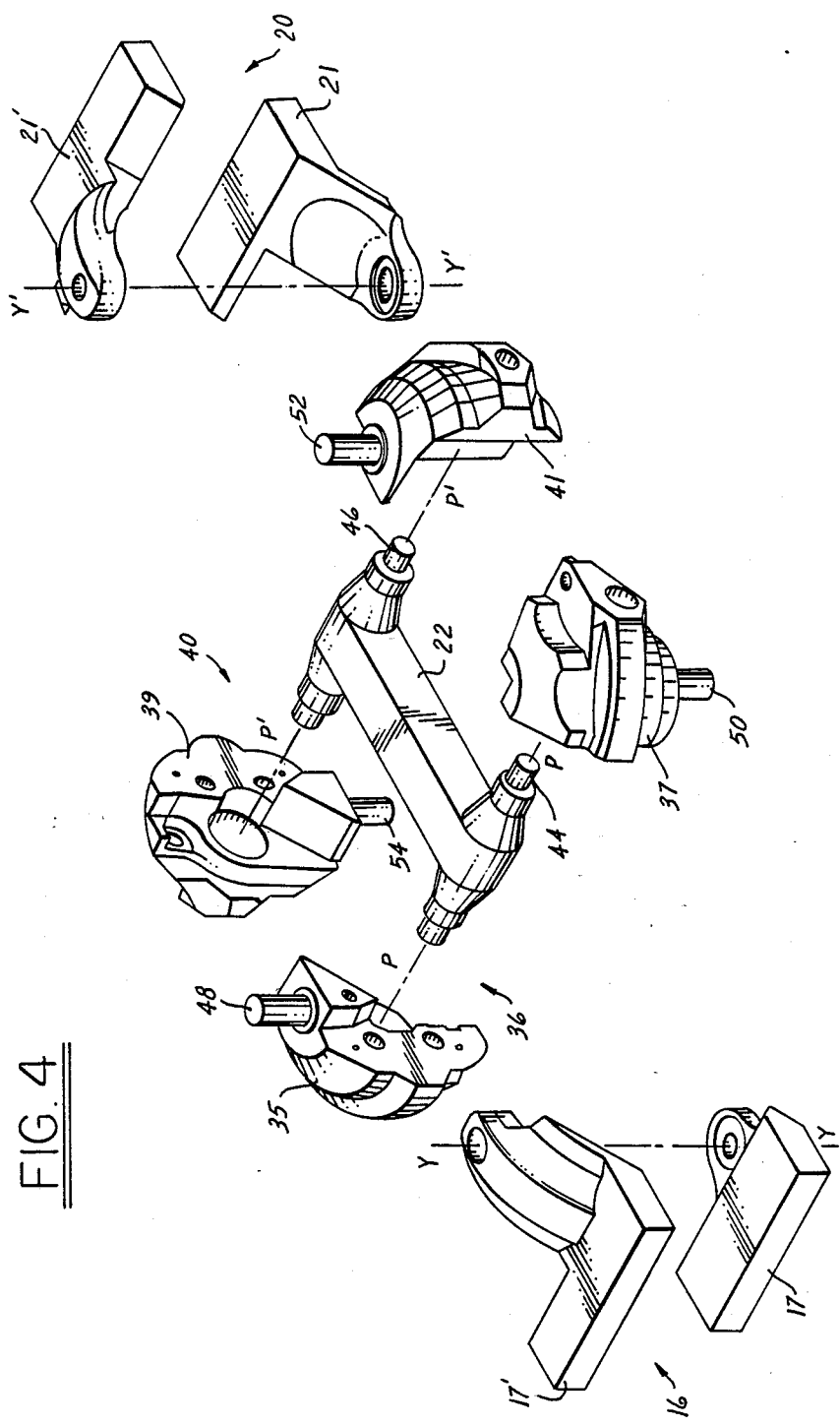
FIG. 4 is an isometric view of the inner gimbal rings, connecting rod, first link and end link in spaced-apart relationship.

Referring now to FIG. 4, first link 16, end link 20 and first and third inner gimbal rings 36, 40 are each formed in two parts. Connecting rod 22 is formed integrally with a first pin 44, directed parallel to axis P—P, and integrally with a second pin 46, directed parallel to the axis of the first pin and parallel also to the axis P'—P'. Pins 44 and 46 are received in bores formed through corresponding gimbal rings, which provide surfaces on which the pins and gimbal rings can rotate. Gimbal ring 36 carries upper and lower stub shafts 48, 50 over which the upper lug and lower lug, respectively, of the first link 16 are fitted. Gimbal ring 36 is supported for rotation about axis Y—Y on the bore formed through the lugs 15, 17 of first link 16. Similarly, third gimbal ring 40 has upper and lower stub shafts 52, 54, which are fitted into the lugs of the upper and lower halves 19, 21 of end link 20 and provide means by which gimbal ring 40 rotates about axis Y'—Y'.

Figure 5:
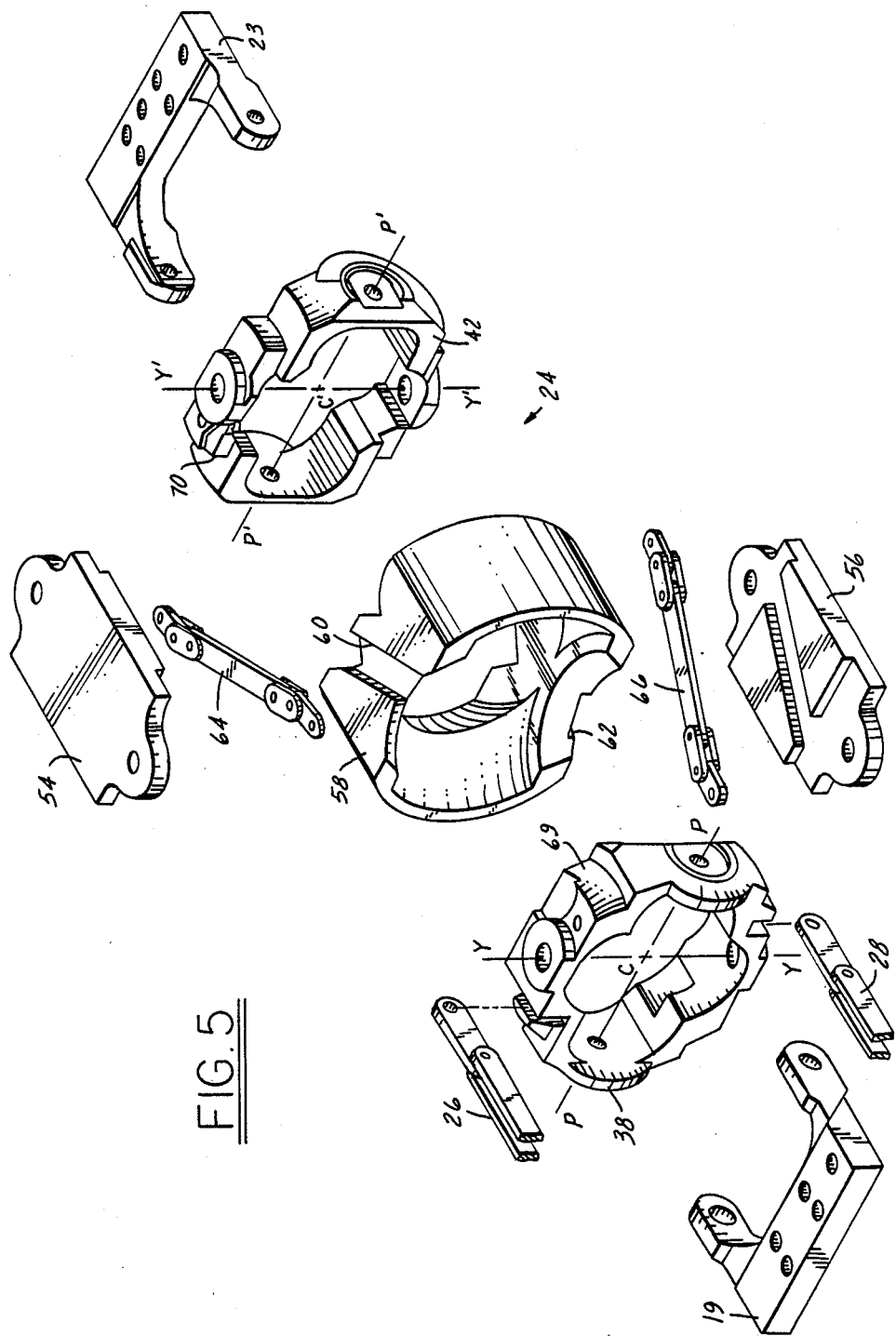
FIG. 5 is an isometric view of the outer gimbal rings, connecting tube, pull rods, yaw equalization chains, first link and end link in spaced-apart relationship.

FIG. 5 shows the relative positions of the connecting tube 24, second gimbal ring 38 having its center at C, the fourth gimbal ring 42 having its center at C', and portion 19, 23 of the first link 16 and end link 20, respectively. The connecting tube includes an upper plate 54, a lower plate 56 and a ring 58 having a planar upper surface on which the upper plate rests and a planar lower surface on which the lower plate rests. Ring 58 has a diagonal slot 60 on its upper surface and an oppositely directed diagonal slot 62 on its lower surface. The upper and lower plates have corresponding diagonal slots which, together with the slots of the ring, form tracks in which yaw equalizing members 64, 66 are located. Member 64 is mechanically connected at its inboard end to second gimbal ring 38 and at its outboard end to fourth gimbal ring 42. These connections are made on opposite sides of the longitudinally directed axis C—C', which connects the centers C and C'.

Fitted between the inner surfaces of the upper and lower lugs of 17', 17 of first link 16 is a fitting 19 having lugs that straddle the XE axis and are fitted within second gimbal ring 38. Fitting 19 is mechanically connected to the side walls of gimbal ring 38 through pins 66, 68 that pass through the lugs of fitting 19 and engage the corresponding lugs on the side walls of the gimbal ring. This connection permits relative rotation between gimbal ring 38 and end link 16 about the P—P axis, which has its center at C. At the outboard end of connecting tube 24, fitting 23, whose lugs straddle the XE axis, is fitted between the upper and lower lugs 21', 21 of end link 20. The lugs of fitting 23, connected by pins to the side walls of fourth gimbal ring 42, permit relative rotation about the P'—P' axis of gimbal ring 42 and end link 20. Pull rod 26 is mechanically connected to the upper surface of gimbal ring 38 and pull rod 28 is connected to the lower surface on the opposite side of axis XE from the location of the connection to rod 26.

Yaw equalizing member 64 has at each end multiple chain links that permits tension load to be transmitted and assures conformance of member 64 with surfaces 69, 70, which guide its movement and define its path from opposite sides of the diagonal recess 60 in which it moves. Similarly, yaw equalizing member 66 has multiple, terminal chain links that permit a tension force to be transmitted along the member and assure its conformance with its diagonal path and around guide surfaces similar to surfaces 69 and 70.

The upper and lower surfaces of the second gimbal ring are connected by pins 72, 74, respectively, to the inboard lugs of the upper and lower plates 54, 56 that comprise the connecting tube 24. Similarly, at the outboard end of the connecting tube, fourth gimbal ring 42 is connected by pins 76, 78, respectively, to the outboard lugs of the upper and lower plates 54, 56.

Figure 6:
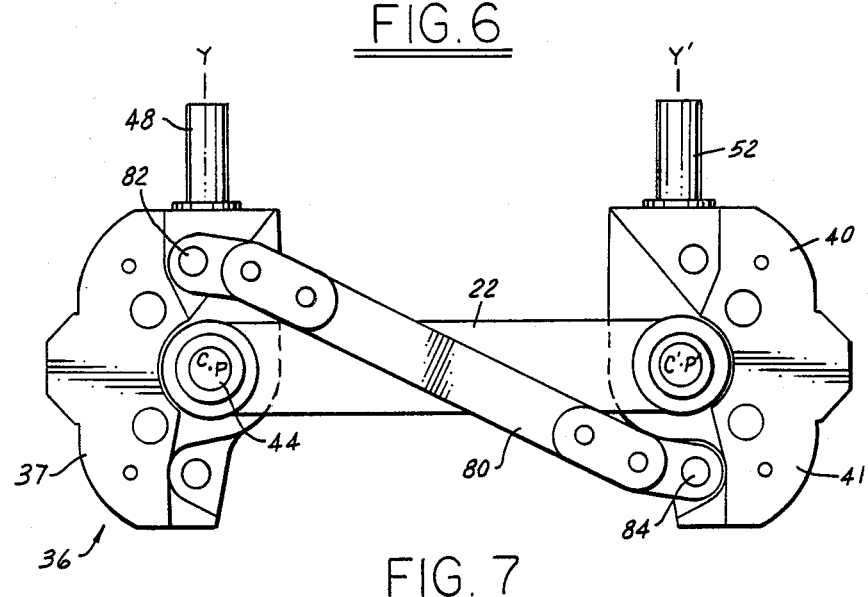
FIG. 6 is a front view of undisplaced inner gimbal rings and a pitch equalization link that connects the inner gimbal rings.

The mechanism for equalizing rotation of the first and third gimbal rings 36, 40 about the pitch axes P and P' is illustrated in FIG. 6. One pitch equalization member 80 is connected by pin 82 to the inner vertical surface of gimbal ring half 37 and is connected by a pin 84 to an inner vertical surface of gimbal ring half 41, which are parts of the first and third gimbal rings, respectively. Pitch equalization member 80 is located on the near side of connecting rod 22, is connected to gimbal ring 36 above axis C—C', and is connected to the third gimbal ring 40 below axis C—C'.

Figure 7:
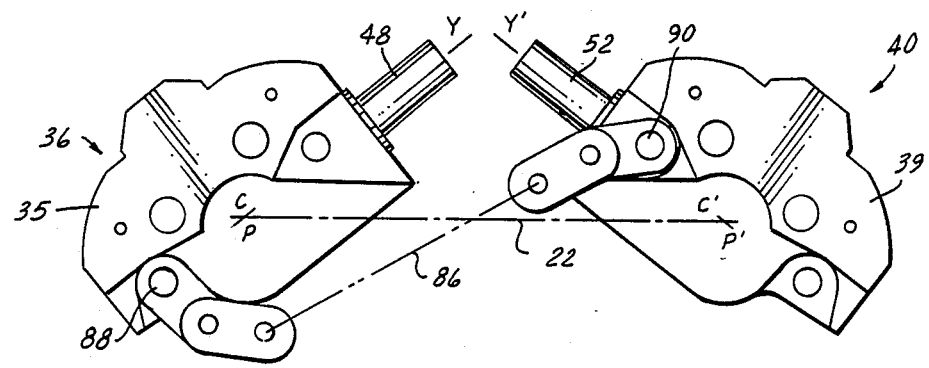
FIG. 7 is a front view of displaced inner gimbal rings and the pitch equalization link that connects the gimbal ring at opposite lateral side of the connecting rod from that illustrated in FIG. 5.

FIG. 7 illustrates the connection of a second pitch equalization member 86 to gimbal rings 36 and 40 on the far side of connecting rod 22. The gimbal rings are shown rotated in opposite directions about pitch axes P—P and P'—P'. Pitch equalization member 86 is connected by pin 80 to an inner vertical surface of gimbal ring half 35, which is a part of first gimbal ring 36, and member 86 is connected by a pin 90 to an inner vertical surface of gimbal ring half 39, which is a part of third gimbal ring 40.

Figure 9:
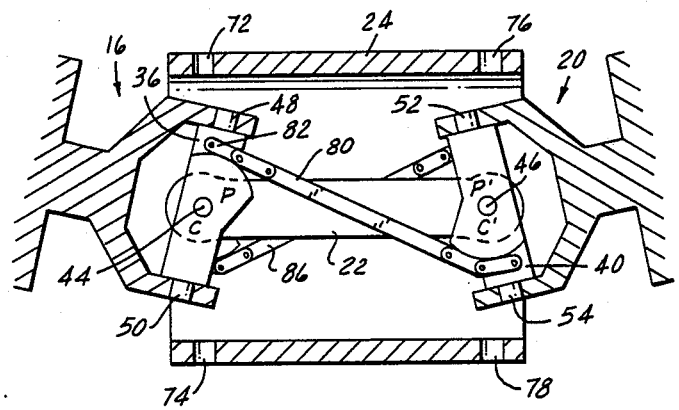
FIG. 9 is a schematic cross section taken at the same plane as in FIGS. 1 and 8 showing pitch equalization links connecting the inner gimbal rings.

FIG. 9 shows schematically the pitch equalization mechanism that includes equalization members 80 and 86 pinned to gimbal rings 36 and 40 on opposite lateral sides of the connecting rod 22.

Figure 8:
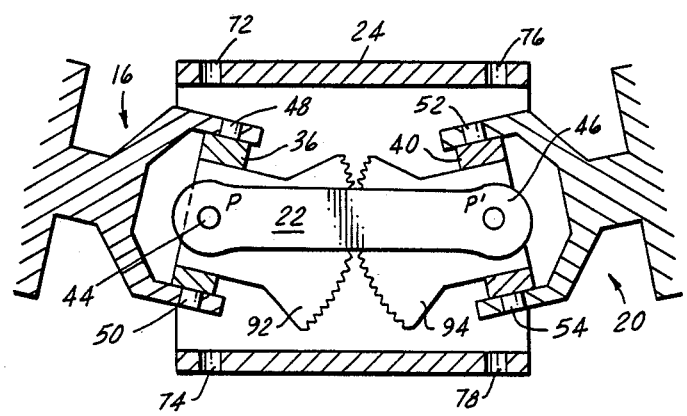
FIG. 8 is a schematic cross section taken at a vertical plane through centers C and C' showing a gear segment formed integrally with each of the inner gimbal rings for producing pitch equalization.

FIG. 8 shows anther means for obtaining angular equality of pitch rotation (called pitch equalization) of the first and third gimbal rings 36, 40 about axes P—P and P'—P'. Here, instead of the two pitch equalization members 80, 86 pinned to the gimbal rings on opposite lateral sides of connecting rod 22, gimbal rings 36, 40 are formed integrally with portions of gear wheels 92, 94, which are in continuous mutual engagement. When gimbal ring 36 rotates clockwise about axis P, gimbal ring 40 rotates counterclockwise about axis P', through the same angular range as that of gimbal ring 36. Outer gimbal rings 38, 42, which are pinned to the connecting tube at 72, 74 and 76, 78, respectively, are not shown in FIG. 8 in order to clarify the pitch equalization technique illustrated there.

Figure 11:
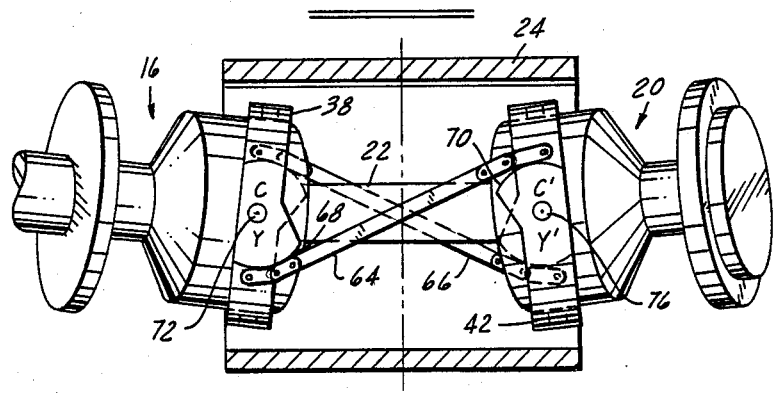
FIG. 11 is a schematic top view of the wrist showing yaw equalization links connecting the outer gimbal rings.

The yaw equalization members 64, 66, illustrated in FIG. 5 in spaced-apart relationship to the other components of the outer gimbal ring and gimbal equalization assembly, are shown schematically in FIG. 11 in their assembled positions. Equalization member 64 is located above connecting rod 22, crosses the C—C' axis and is pinned at one end to the upper surface of outer gimbal ring 38 and at the other end to the upper surface of outer gimbal ring 42. Similarly, yaw equalization member 66 is located below connecting rod 22, extends diagonally across axis C—C' in the opposite diagonal direction from that of member 64, is pinned at one end to the lower surface of gimbal ring 38 and is pinned at the other end to the lower surface of gimbal ring 42.

Figure 10:
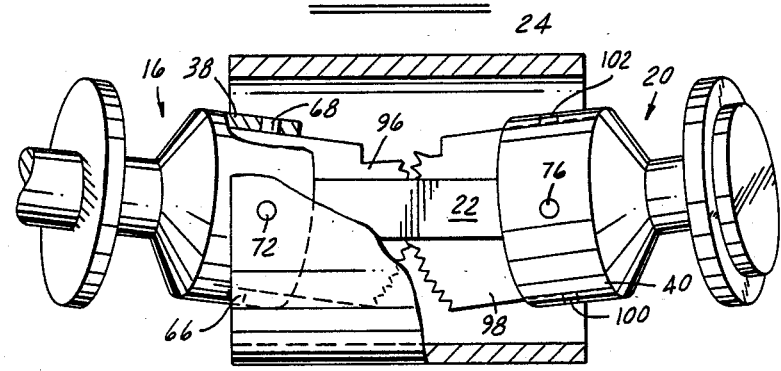
FIG. 10 is a schematic top view of the wrist showing gear segments formed integrally with the outer gimbal rings for producing yaw equalization.

Yaw equalization can also be effected by the device shown in FIG. 10, which includes a first gear wheel portion 96 fixed to outer gimbal ring 38 and another gear wheel portion 98 fixed to fourth gimbal ring 42 in continuous meshing engagement with wheel 96.

The non-singular robot wrist, according to this invention, is actuated for yaw displacement in a similar way to the pitch displacement previously discussed. FIGS. 1 and 2A show the actuators used for pitch and yaw motion. When tension is applied to either pull rod 26 or 28, which are pin connected to gimbal ring 38, rotation of that gimbal ring about the P—P axis results. Because of the pivotal connection of gimbal ring 38 on connecting tube 24, the tube also will be forced to pitch when tension is applied to either pull rod 26 or 28, but the tube is free to yaw, i.e., to rotate about the Y—Y axis, independently. Tension applied to pull rod 26 causes gimbal ring 38 to pitch upward; tension applied to pull rod 28 causes the gimbal ring to pitch downward. The motion is transmitted to center C', the center of the third and fourth gimbal rings, thereby producing corresponding pitch displacement of end link 20. Through operation of the pitch equalization mechanism, center line XE of end link 20 is angularly displaced by twice the amount and in the same direction as the C—C' axis.

Similarly, pull rods 27 and 29 are pin connected to the first gimbal ring 36 on laterally opposite sides of axis Y—Y. When tension is applied to pull rods 27, 29 rotation of that gimbal ring about axis Y—Y results. Because of the pivotal connection of connecting rod 22 to gimbal ring 36, the rod is forced to yaw when tension is applied to either of pull rods 27 or 29, but the rod is free to pitch independently. Tension applied to pull rod 27 causes yaw displacement to the right when the wrist assembly is viewed from above; tension applied to pull rod 29 causes yaw displacement to the left. The yaw equalization mechanism previously described causes the center line XE of end link 20 to deflect about the Y'—Y' axis at center C' by twice the amount and in the same direction as the yaw displacement of axis C—C'.

First gimbal ring 36 is rotatably supported on the first link for yaw rotation about the Y—Y axis at center C. Connecting rod 22 is rotatably supported on gimbal ring 36 so that the rod can pitch abut axis P—P.

Second gimbal ring 38 is rotatably supported on the first link 16 for rotation about the P—P pitch axis and is joined to the connecting tube 24 at a pin connection that permits relative rotation of the tube and ring 38 about the Y—Y axis.

Similarly, the third gimbal ring 40 rotatably supports connecting rod 22 for rotation about the P'—P' pitch axis at center C' and is rotatably mounted on end link 20 for rotation about the Y'—Y' axis. Fourth gimbal ring 24 is supported at the outboard end of end link for rotation about P—P pitch axis and is rotatably connected to the connecting tube for rotation about the Y'—Y' axis.

Therefore, links 16 and 20 are interconnected by two universal joints in series having their centers at C and C', respectively, and the connecting rod 22 functions as an intermediate shaft between these universal joints. In parallel with the universal joints, links 16 and 20 are interconnected also by two additional universal joints in series, the joints comprising the components that are connected to gimbal rings 38 and 42. Connecting tube 24 functions as an intermediate shaft between the latter two universal joints because center C is the common center point of the universal joints that include gimbal ring 38 and link 76, respectively, and C' is the common center of the universal joints that include gimbal ring 42 and link 20, respectively. Therefore, links 16 and 20 have a common centerline, which connects C and C'.

The angular deflection in pitch, yaw or a combination of pitch and yaw, of tube 24 is the same as the angular deflection of rod 22 because the two universal joints centered at C have the same angular displacement in magnitude and sense of direction. The angular deflection in pitch, yaw or pitch and yaw combined at the universal joints that are connected to end link 20 is the same as the angular deflection of the universal joints that include gimbal ring 42.

Because of the equality of deflection in each of the four universal joints, the angle of pitch or yaw rotation between the centerline XE of the end link and the centerline XA of the robot arm is exactly twice as large as the angle Θ between the axis C—C' of the rod or tube and axis XA. Furthermore, the direction of 2 Θ is the same as the direction of angle Θ, in the pitch rotational sense, the yaw rotational sense and in any combination of pitch and yaw rotations. Axis XA, axis C—C' and axis XE always lie in the same plane with the non-singular industrial robot wrist. End link 20 and any tool attached to it can be given large deflections in pitch, yaw and combinations of these and the deflections can exceed 90 degrees. When, for example, the angular displacement is 100 degrees, the deflection in each universal joint is only 50 degrees, and there is no gimbal lock or singularity.

Gimbal rings 36 and 40 are free to rotate relative to rod 22 about two parallel axes, the pitch axes P—P and P'—P'. The pitch displacement angles of the universal joints that include the first and third gimbal rings 36, 40 are made equal by the devices shown in FIGS. 8 and 10. For example, the deflection of gimbal ring 40 relative to rod 22 is made equal to the yaw displacement of rod 22 relative to gimbal ring 36 by connecting gimbal ring 36 to gimbal ring 40 through a set of 1:1 spur gear segments shown in FIG. 8. Gimbal rings 38 and 42 are free to rotate relative to tube 24 about two parallel yaw axes, the Y—Y and Y'—Y' axes. The yaw displacement angle of the universal joints that include gimbal rings 38, 42 is made equal to the yaw displacement of tube 24 relative to gimbal ring 38 by connecting gimbal ring 38 to gimbal ring 42 through a set of 1:1 yaw gear segments such as those shown in FIG. 10. However, in the preferred embodiment of the invention, the gearing is replaced by the drive mechanism shown in FIGS. 6, 7, 9 and 11. In FIG. 9, pitch equalizing member 80, which extends from the upper left to the lower right, passes in front of rod 22 and the other equalizing member 86 passes behind the rod. If first gimbal ring 36 is rotated clockwise relative to rod 22, third gimbal ring 40 rotates counter-clockwise through an equal angle. This arrangement is functionally equivalent to the gearing shown in FIG. 8. When both members are taut, there is no backlash and the tension in members 80, 86 will radially preload the bearings between the gimbal rings 36, 40 and the rod, thereby eliminating lost motion due to radial bearing clearances. The assembly that includes the tension equalization members is a more compact design than the gearing, and overall size of the wrist mechanism is smaller.

Members 80, 86, which may be chains or cables, equalize the pitch components of articulation about centers C and C'.

The two tension member arrangement that controls yaw rotation of gimbal rings 38 and 42 relative to the connecting tube 24 is shown in FIG. 11, which is a top view showing the transverse midplane that bisects the C—C' axis. This arrangement equalizes the yaw components of articulation about center C and C'. Due to the operation of the pitch and yaw equalization mechanism, links 16 and 20 have the relationship of an object and its mirror image with respect to the transverse midplane. The mechanism that connects link 16 to link 20 is functionally equivalent to a constant velocity coupling connecting links 16 and 20 to a first train of components that includes gimbal ring 36, rod 22 and gimbal ring 40 and to a second train of components that includes gimbal ring 38, rod 22 and gimbal ring 42. Both of these trains connect link 20 to link 16 and represent redundant restraints. The constant velocity coupling relationship guarantees that the two constraints are compatible with respect to their effects on the displacement produced in links 16 and 20.

By coordinating the pitch and yaw actualization of the tension rods 26, 27, 28 and 29, link 20 can be made to rotate in a pure rolling or spinning motion about its own axis XE while it is inclined as shown in FIG. 1. In this case, the mechanism will behave as a constant velocity joint, though it does not require axis XE of the tool carrying end link 20 to be externally supported.

Having described the preferred embodiment of my invention, what I claim and desire to secure by U.S. Letters Patent is:

1. A wrist for an arm comprising:
   a first link;
   an end link;
   a rod connecting the first link and end link, a first center and a second center spaced apart on the rod;
   a connecting tube;
   first gimbal means for connecting the rod and the first link for rotation about a first pair of perpendicular axes that intersect at the first center;
   second gimbal means concentric with the first center for connecting the tube and the first link;
   third gimbal means for connecting the rod and the end link for rotation about a second pair of perpendicular axes that intersect at the second center;
   fourth gimbal means concentric with the second center for connecting the tube and the end link;
   first means for substantially equalizing the amount of rotation of the first link about a first axis of the first pair of axes at the first center, and the amount of rotation of the end link about a first axis of the second pair of axes at the second center; and
   second means for substantially equalizing the amount of rotation of the first link about the second axis of the first pair of axes at the first center and the amount of rotation of the end link about the second axis of the second pair of axes at the second center.

2. The device of claim 1 wherein the first equalizing means include:
   a first gear mounted for rotation about the first axis of the first pair of axes at the first center; and
   a second gear engaged with the first gear, mounted for rotation at the second center about the axis of the second pair of axes that is parallel to said first axis of the first pair of axes.

3. The device of claim 1 wherein the second equalizing means includes:
   a third gear mounted for rotation about the second axis of the first pair of axes at the first center; and
   a fourth gear engaged with the third gear, mounted for rotation at the second center about the axis of the second pair of axes that is parallel to said second axis of the first pair of axes.

4. The device of claim 1 wherein the first equalizing means includes:
   a first gear mounted for rotation about the first axis of the first pair of axes at the first center; and
   a second gear engaged with the first gear, mounted for rotation at the second center about the axis of the second pair of axes that is parallel to said first axis of the first pair of axes;
   and wherein the second equalizing means includes:
   a third gear mounted for rotation about the second axis of the first pair of axes at the first center; and
   a fourth gear engaged with the third gear, mounted for rotation at the second center about the axis of the second pair of axes that is parallel to said second axis of the first pair of axes.

5. The device of claim 1 wherein the first equalizing means includes:
   a first connecting means having one end attached to the first gimbal means at a position offset from the plane that contains the pitch axis and the axis that connects the centers at the first center, said attachment being located above said plane, and having a second end attached to the third gimbal means at a position offset from the plane that contains the pitch axis and the axis that connects the centers at the second center, said attachment being located below said plane; and
   a second connecting means having one end attached to the first gimbal means at a position offset from the plane that contains the pitch axis and the axis that connects the centers at the first center, said attachment being located below said plane and having a second end attached to the third gimbal means at a position offset from the plane that contains the pitch axis and the axis that connects the centers at the second center, said attachment being located above said plane.

6. The device of claim 1 wherein the second equalizing means includes:
   a third connecting means having a first end attached to the second gimbal means at a position offset from the plane that contains the axis that connects the centers and the yaw axis at the first center, said attachment being located at a first lateral side of said plane, and having a second end attached to the fourth gimbal means at a position offset from the plane that contains the axis that contains the centers and the yaw axis at the second center, said attachment being located at the opposite lateral side of said plane from the location of the first end; and
   a fourth connecting means having a first end attached to the second gimbal means at a position offset from the plane that contains the axis that connects the centers and the yaw axis at the first center, said attachment being located at the opposite lateral side of said plane from the location of the first end of the third connecting element, and having a second end attached to the fourth gimbal means at a position offset from the plane that contains the axis that connects the centers and the yaw axis at the second center, said attachment being located at the opposite lateral side of said plane from the location of the first end.

7. The device of claim 1 wherein the first equalizing means includes:
   a first connecting means having one end attached to the first gimbal means at a position offset from the plane that contains the pitch axis and axis that connects the centers at the first center, said attachment being located above said plane, and having a second end attached to the third gimbal means at a position offset from the plane that contains the pitch axis and the axis that connects the centers at the second center, said attachment being located below said plane; and
   a second connecting means having one end attached to the first gimbal means at a position offset from the plane that contains the pitch axis and the axis that connects the centers at the first center, said attachment being located below said plane and having a second end attached to the third gimbal means at a position offset from the plane that contains the pitch axis and the axis that connects the centers at the second center, said attachment being located above said plane;
   and wherein the second equalizing means includes:
   a third connecting means having a first end attached to the second gimbal means at a position offset from the plane that contains the axis that connects the centers and the yaw axis at the first center, said attachment being located at a first lateral side of said plane, and having a second end attached to the fourth gimbal means at a position offset from the plane that contains the axis that contains the centers and the yaw axis at the second center, said attachment being located at the opposite lateral side of said plane from the location of the first end; and a fourth connecting means having a first end attached to the second gimbal means at a position offset from the plane that contains the axis that connects the centers and the yaw axis at the first center, said attachment being located at the opposite lateral side of said plane from the location of the first end of the third connecting element, and having a second end attached to the fourth gimbal means at a position offset from the plane that contains the axis that connects the centers and the yaw axis at the second center, said attachment being located at the opposite lateral side of said plane from the location of the first end.

8. The device of claim 7 wherein the first, second, third and fourth connecting means include chain links at each of its ends near the respective gimbal means to which the connecting means is attached.

9. The device of claim 1 further comprising:
pitch actuating means connected to the first gimbal means for rotating the first gimbal means with respect to the pitch axis at the first center; and
yaw actuating means for rotating the second gimbal means with respect to the yaw axis at the first center.

10. The device of claim 1 further including pitch actuating means which includes:
upper and lower pull rods connected to the first gimbal means respectively above and below the plane that contains the axes that connects the centers and the pitch axis at the first center;
left-hand and right-hand pull rods connected to the second gimbal means at respectively opposite sides of the plane that contains the axes that connects the centers and the yaw axis at the first center; and
drive means connected to the upper, lower, left-hand and right-hand pull rods for selectively articulating the first and second gimbal means.

11. The device of claim 2 further including pitch actuating means which includes:
upper and lower pull rods connected to the first gimbal means respectively above and below the plane that contains the axes that connects the centers and the pitch axis at the first center;
left-hand and right-hand pull rods connected to the second gimbal means at respectively opposite sides of the plane that contains the axes that connects the centers and the yaw axis at the first center; and
drive means connected to the upper, lower, left-hand and right-hand pull rods for selectively articulating the first and second gimbal means.

12. The device of claim 3 further including pitch actuating means which includes:
upper and lower pull rods connected to the first gimbal means respectively above and below the plane that contains the axes that connects the centers and the pitch axis at the first center;
left-hand and right-hand pull rods connected to the second gimbal means at respectively opposite sides of the plane that contains the axes that connects the centers and the yaw axis at the first center; and
drive means connected to the upper, lower, left-hand and right-hand pull rods for selectively articulating the first and second gimbal means.

13. The device of claim 4 further including pitch actuating means which includes:
upper and lower pull rods connected to the first gimbal means respectively above and below the plane that contains the axes that connects the centers and the pitch axis at the first center;
left-hand and right-hand pull rods connected to the second gimbal means at respectively opposite sides of the plane that contains the axes that connects the centers and the yaw axis at the first center; and
drive means connected to the upper, lower, left-hand and right-hand pull rods for selectively articulating the first and second gimbal means.

14. The device of claim 5 further including pitch actuating means which includes:
upper and lower pull rods connected to the first gimbal means respectively above and below the plane that contains the axes that connects the centers and the pitch axis at the first center;
left-hand and right-hand pull rods connected to the second gimbal means at respectively opposite sides of the plane that contains the axes that connects the centers and the yaw axis at the first center; and
drive means connected to the upper, lower, left-hand and right-hand pull rods for selectively articulating the first and second gimbal means.

15. The device of claim 6 further including the pitch actuating means which includes:
upper and lower pull rods connected to the first gimbal means respectively above and below the plane that contains the axes that connects the centers and the pitch axis at the first center;
left-hand and right-hand pull rods connected to the second gimbal means at respectively opposite sides of the plane that contains the axes that connects the centers and the yaw axis at the first center; and
drive means connected to the upper, lower, left-hand and right-hand pull rods for selectively articulating the first and second gimbal means.

16. The device of claim 7 further including pitch actuating means which includes:
upper and lower pull rods connected to the first gimbal means respectively above and below the plane that contains the axes that connects the centers and the pitch axis at the first center;
left-hand and right-hand pull rods connected to the second gimbal means at respectively opposite sides of the plane that contains the axes that connects the centers and the yaw axis at the first center; and
drive means connected to the upper, lower, left-hand and right-hand pull rods for selectively articulating the first and second gimbal means.

17. The device of claim 8 further including pitch actuating means which includes:
upper and lower pull rods connected to the first gimbal means respectively above and below the plane that contains the axes that connects the centers and the pitch axis at the first center;
left-hand and right-hand pull rods connected to the second gimbal means at respectively opposite sides of the plane that contains the axes that connects the centers and the yaw axis at the first center; and
drive means connected to the upper, lower, left-hand and right-hand pull rods for selectively articulating the first and second gimbal means.

18. The device of claim 1 wherein the first gimbal means is a ring connected to the first link for rotation about the yaw axis at the first center and joined to the connecting rod for rotation about the pitch axis at the first center;

the second gimbal means is a ring concentric with the first center connected to the tube for rotation about the yaw axis at the first center and supported on the first link for rotation about the pitch axis at the first center;

a third gimbal means is a ring having its center at the second center connected to the end link for rotation about the yaw axis at the second center and joined to the connecting rod for rotation about the pitch axis at the second center; and the fourth gimbal means is a ring concentric with the second center connected to the tube for rotation about the yaw axis at the second center and supported on the end link for rotation about the pitch axis at the second center.

* * * * *